May 21, 1963

T. ONGARO 3,090,237

LATHE BALANCING SUPPORT STANDS

Filed July 21, 1960

INVENTOR.
THEODORE ONGARO
BY
Harry B. Keck
ATTORNEY

May 21, 1963  T. ONGARO  3,090,237
LATHE BALANCING SUPPORT STANDS
Filed July 21, 1960  3 Sheets-Sheet 2
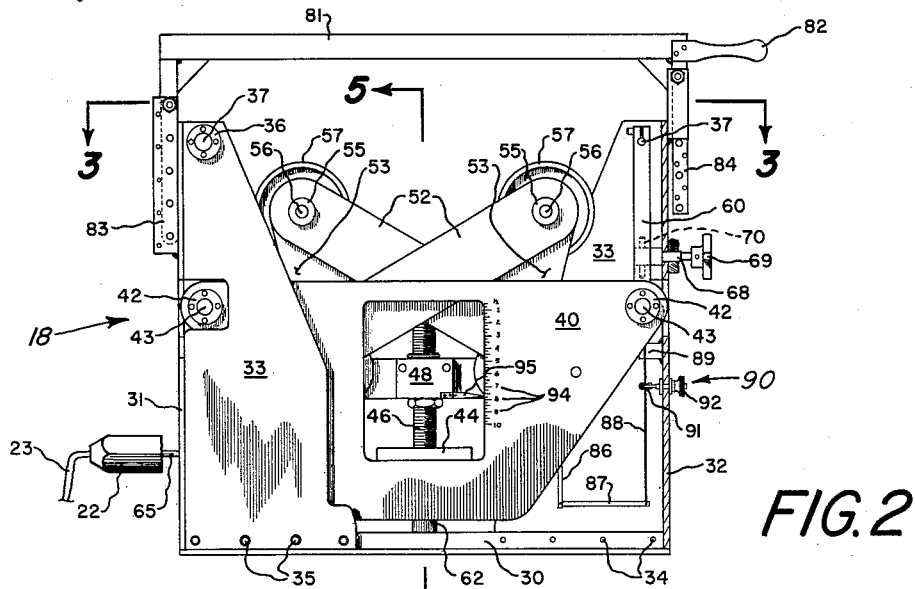
FIG. 2
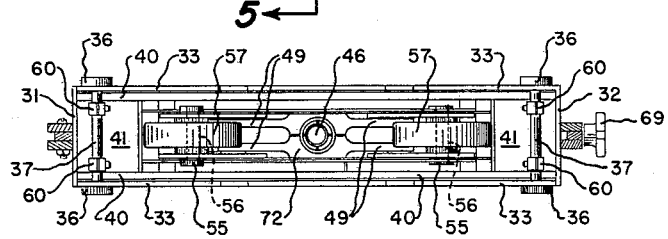
FIG. 3
FIG. 6
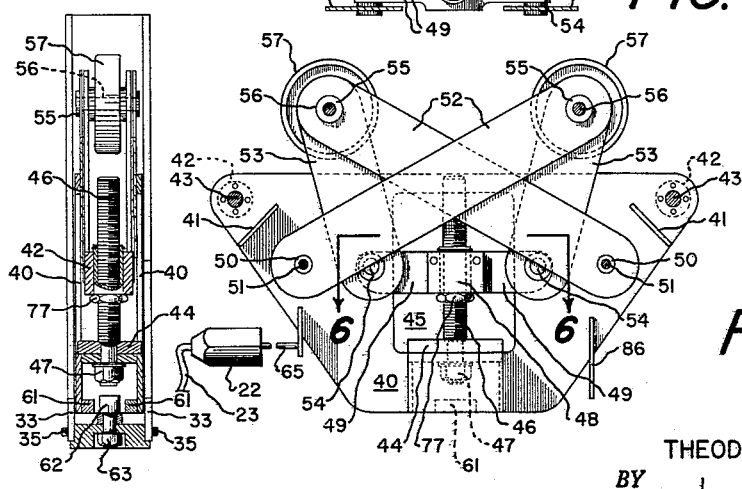
FIG. 4
FIG. 5
INVENTOR.
THEODORE ONGARO
BY
Harry B. Keck
ATTORNEY May 21, 1963 T. ONGARO 3,090,237
LATHE BALANCING SUPPORT STANDS
Filed July 21, 1960 3 Sheets-Sheet 3

INVENTOR.
THEODORE ONGARO
BY
Harry B. Keck
ATTORNEY

3,090,237
LATHE BALANCING SUPPORT STANDS
Theodore Ongaro, Columbus, Ohio, assignor to International Research and Development Corporation
Filed July 21, 1960, Ser. No. 44,355
7 Claims. (Cl. 73—462)

This invention relates to apparatus for the dynamic balancing of rotors. More particularly, this invention relates to the utilization of a conventional metal working lathe as a dynamic balancing stand.

The dynamic balancing of rotors is a highly developed art. In the so-called two-plane balancing technique, a test rotor is supported in a suitable balancing stand and is caused to rotate while supported on movable bearings. The movement of the bearings is consequential to the unbalance of the test rotor. The movement of the bearings is electromechanically converted into sinusoidal electrical impulses which are analyzed by appropriate phase and amplitude measurements to determine, in relation to the two planes of measurement, the geometric location and quantity of unbalance in the test rotor.

The art is replete with simple and complex supporting stands which are for the most part quite bulky and space consuming. The available apparatus for analyzing the sinusoidal electrical impulses is lightweight and compact. However, the lightweight, compact analytical apparatus cannot be utilized unless there is an available support stand in which the test rotor may be supported and turned in order to manifest its unbalance characteristics.

According to the present invention, I have provided a pair of rotor supports which can be affixed to the horizontal bed of a conventional metal working lathe in place of the familiar steady-rest and follow-rest apparatus which are normally provided with such lathes. Through utilization of the present invention, any conventional metal working lathe can be converted quickly into a suitable dynamic balancing support stand. By the term "conventional metal working lathe" I comprehend those machine tools having a horizontal bed and, at one end, a driving head stock including a prime mover. Normally such conventional metal working lathes include speed controls through which the rotation of a driving head can be regulated.

In addition to the support stands of this invention, a suitable low friction, constant speed universal drive coupling preferably is provided to transfer the driving torque from the head stock to the supported rotor. A suitable constant speed universal drive coupling for this purpose is described in my co-pending application S.N. 840,355 filed September 16, 1959, and assigned to the assignee of the present invention.

The implications of the present invention are clear. Nearly every machine shop includes in its inventory at least one metal working lathe. Few machine shops can justify the expense and space requirements of the balancing support stands heretofore available. By utilization of the present invention, a simple conventional metal working lathe can be quickly converted into a sensitive balancing test stand for dynamic balancing of rotors.

Thus the object of this invention is to provide a new apparatus for dynamic balancing of rotors which utilizes a conventional metal working lathe.

A further object of this invention is to provide support stands which can be affixed to a conventional metal working lathe in the manner of the familiar steady-rest and follow-rest whereby the lathe is converted into a dynamic balancing test stand.

Another object of this invention is to provide dynamic balancing support stands which can be affixed to a horizontal lathe bed and can be readily adjusted to accommodate rotors having shaft diameters ranging from about one-half inch through about 20 inches.

According to a preferred embodiment of this invention, the pair of rotor support stands is provided, each stand including a pair of scissors mounted supporting wheels which are held in an oscillatably mounted cradle secured to a horizontal lathe bed. The supporting wheels can be adjusted to accommodate rotors having any normal diameter from about one-half inch through about 20 inches with automatic centering of the rotor axis and the lathe head stock drive axis. The entire dynamic balancing operation can be completed in a single setting of the present support stands. A vibration magnifying feature may be included to increase the sensitivity of vibration measurements. A useful lock-up feature is provided to stabilize the support stands during rotor installation and removal.

The present invention, its objects and advantages will be more fully understood from the following detailed description by reference to the accompanying drawings in which:

FIGURE 2 is a front elevation of the balance stands shown in FIGURE 1—one of the trunnion face plates is removed to illustrate inside details;

FIGURE 3 is a plan view, partly in cross-section, of the lathe support taken along the line 3—3 of FIGURE 2;

FIGURE 4 is a front elevation view of an oscillatable cradle structure and support linkage seen in part in FIGURE 2;

FIGURE 5 is a cross-section view of the present lathe support taken along the line 5—5 of FIGURE 2;

FIGURE 6 is a plan view of a vertically movable support block seen in FIGURES 2, 3, 4 and 5;

FIGURE 7 is a perspective illustration of the support block shown in FIGURE 6, partly broken away to illustrate fastening details;

Figure 1:
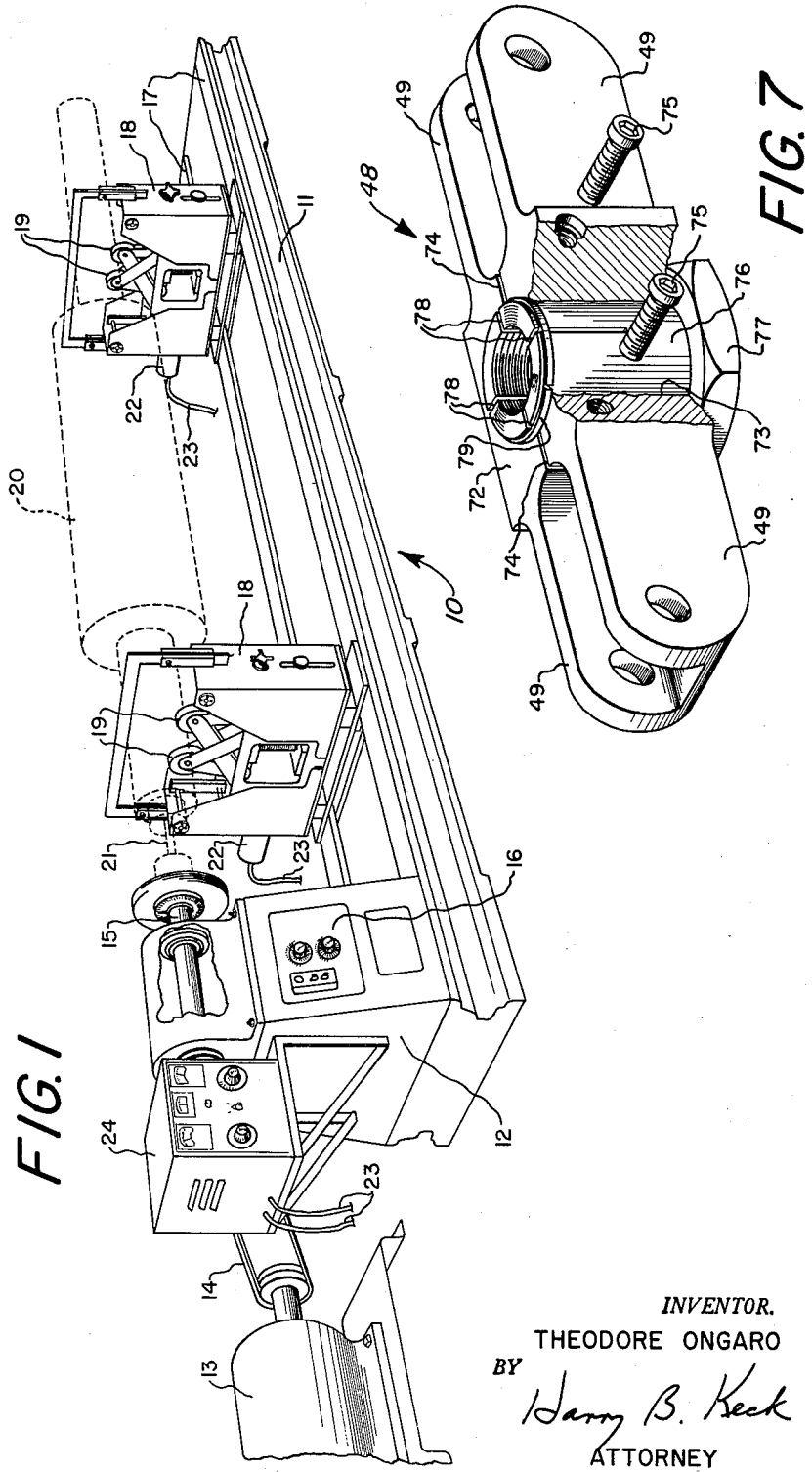
FIGURE 1 is a perspective illustration of a typical metal working lathe modified by the present invention to serve as a dynamic balancing test stand.

Referring to FIGURE 1, a conventional metal working lathe is indicated generally by the numeral 10. The lathe components include a horizontal bed 11 and a head stock 12. A suitable prime mover such as motor 13 and driving connections such as a V-belt 14 are provided to turn a lathe drive shaft 15. Suitable controls in a panel 16 are provided on the front of the head stock 12 to regulate the speed of the lathe drive shaft 15. Horizontal rails 17 extend lengthwise of the horizontal bed 11 and normally serve to support a steady-rest and follow-rest when the lathe 10 is functioning as a metal working lathe. The steady-rest and follow-rest have been removed from the lathe 10 and, in their stead, balance stands 18 have been fastened to the horizontal rails 17.

The balance stands 18 will be hereinafter described in greater detail. For the present discussion it is important to note that the balance stands 18 include a pair of rotor supporting rolls 19 which are fixed in relation to one another and are oscillatable transversely to the horizontal rails 17.

A rotor 20 shown in phantom outline is supported on the rotor supporting rolls 19 with its axis aligned with the axis of the drive shaft 15. A suitable constant velocity universal drive shaft coupling 21 joins the drive shaft 15 with the rotor 20 in driving relation.

Upon rotation of the rotor 20, any unbalances will manifest themselves in vibratory movement of the rotor supporting rolls 19 which, as heretofore stated, are oscillatably mounted. The resulting oscillations of the rotor supporting rollers 19 are measured by suitable electromechanical transducers 22 which are securely fastened to the rigid cradle structure including the rotor supporting rolls 19. A preferred electromechanical transducer is disclosed in co-pending application Serial No. 5,753, filed February 1, 1960, and assigned to the assignee of the present invention. The electromagnetic transducer 22 will translate any mechanical movement of the rotor supporting rollers 19 into a sinusoidal electrical signal which is transmitted through electrical conductors 23 to input terminals of electrical wave analyzing apparatus 24 wherein the phase and amplitude of the translated electrical signal can be measured and related to the physical constants of the rotor 20. Suitable electrical wave analyzing apparatus for dynamic balancing purposes has been disclosed in U.S. Patent No. 2,711,647, assigned to the assignee of the present invention. The rotor unbalance manifested in electrical signals entering into the electrical wave analyzing apparatus 24 through the electrical conductors 23 preferably is obtained at or near the normal rotational speed of the rotor 20 and can be related to the physical dimensions of the rotor in order that balance corrective measures may be taken, for example, the addition of suitable weights or the removal of suitable quantities of material according to the physical construction of the rotor 20.

When it is desired to discontinue the use of the lathe 10 as a balancing test stand, the balance stands 18 may be removed from the horizontal rails 17 and replaced by the conventional steady-rest and follow-rest customarily employed with metal working lathes 10. The coupling 21 similarly is not required when the lathe 10 is performing its conventional metal cutting functions.

Support Stands

As shown in FIGURES 2, 3, 4 and 5, the present support stand 18 includes a balance stand housing which includes a base plate 30, vertical end plates 31, 32 and four trunnion face plates 33. In FIGURE 2, the right hand front trunnion face plate has been removed to expose internal elements. A plurality of screw-receiving openings 34 is provided in the base plate 30. Screws 35 are provided to secure the trunnion face plates 33 to the base plate 30.

A bushing 36 or bearing is bolted in the upper portion of each trunnion face plate 33 to receive the ends of a shaft 37 extending from one trunnion face plate 33 to an opposed trunnion face plate 33.

A cradle assembly, illustrated in FIGURE 4, will now be described. Two cradle face plates 40 of generally trapezoidal configuration are secured in side-by-side spaced relation by means of stiffening plates 41. A pair of bushings 42 or bearings is provided at the upper corners of each cradle face plate 40 to receive a shaft 43 extending between the opposed cradle face plates. A stud shaft support plate 44 extends between the opposed cradle face plates 40 through a generally rectangular opening 45 in each of the cradle face plates 40. A threaded main support stud shaft 46 is mounted in a vertical opening in the stud shaft support plate 44 and is secured in the vertical position by means of a stud shaft lock nut 47. A toggle arm support block 48, more fully shown in FIGURE 7, is threadedly secured to the main support stud shaft 46 as will be hereinafter described. The toggle arm support block 48 has a pair of journals 49 extending in opposite directions between the cradle face plates 40.

A pair of bushings 50 or bearings is provided in each of the cradle face plates 40 to receive a pin 51 upon which the lower end of a crisscross toggle arm 52 is pivotally mounted internally of the cradle face plates 40.

A pair of upright toggle arms 53 is secured to the journals 49 of the toggle arm support block 48 by means of pins 54. The upper ends of the crisscross toggle arms 52 and the upright toggle arms 53 are secured by means of a bushing 55 or bearing which receives a horizontal pin 56. A pair of rotor supporting wheels 57 is rotatably mounted on the horizontal pins 56 between opposed toggle arms 53.

It will be observed that as the toggle arm support block 48 moves upwardly on the threaded main support stud shaft 46, the two rotor supporting wheels 57 move toward each other. Similarly as the toggle arm support block 48 moves downwardly on the threaded main support stud shaft 46, the rotor supporting wheels 57 move apart from each other.

The entire cradle assembly shown in FIGURE 4 is positioned within the trunnion face plates 33, as shown in FIGURE 2 by means of two pendulum arms 60 which are pivotally mounted at their upper ends on the horizontal shaft 37 and on their lower ends to the horizontal shaft 43. Thus the entire cradle assembly is supported from the horizontal shafts 37, 43 in the manner of a pendulum. The entire cradle assembly is free to oscillate between the trunnion face plates 33. In order to limit the oscillation of the cradle assembly to movement only in a direction parallel to the trunnion face plates 33, a guide assembly is provided which is clearly illustrated in FIGURE 5 where a pair of guide blocks 61 are provided on the inner surface of each of the cradle face plates 40. A guide pin 62 extends upwardly through the base plate 30 and is secured by means of a guide pin lock nut 63. The guide pin 62 and guide blocks 61 prevent any wobbling motion of the cradle assembly.

Mounted on one side of the cradle face plates 40 is a pick-up prod plate 65 to which a suitable electromagnetic transducer 22 is rigidly fastened. The electromagnetic transducer 22 serves to translate any oscillating movement of the cradle assembly into an electrical signal which is transferred through a cable 23 as described hereinbefore in connection with FIGURE 1.

Locking Feature

Figure 8:
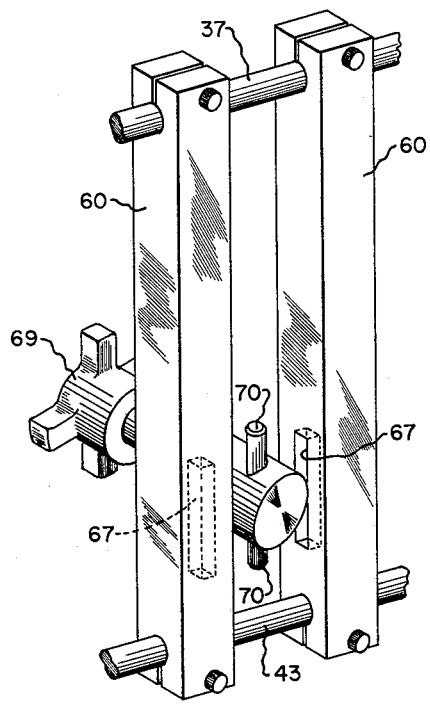
FIGURE 8 is a perspective illustration of a locking means shown in FIGURE 2.

In order to lock the cradle assembly in a fixed position during the installation and removal of a test rotor, a locking means is provided in association with one pair of pendulum arms 60 as shown in FIGURE 2 and FIGURE 8. A vertical lock groove 67 is provided on the inner faces of the adjoining pendulum arms 60. A locking stud 68 extends through the end plate 32 and is equipped with a locking handle 69 externally of the end plate 32 and a pair of locking pins 70 which are positioned between the depending pendulum arms 60. With the locking stud 68 in the position shown in FIGURE 8, the entire cradle structure is free to oscillate. By twisting the locking handle 69 through one quarter turn, the locking pins 70 engage the vertical lock grooves 67 and rigidly engage the pendulum arms 60; hence the entire rigid cradle assembly is confined.

Toggle Arm Support Block

The toggle arm support block 48 will be described by reference to FIGURE 7. The toggle arm support block 48 includes a central hub portion 72 and four journals 49. A central vertical bore 73 is provided in the hub portion 72. A vertical slot 74 extends part way through the hub portion 72. A pair of lock screws 75 are threadedly engaged through the central hub portion 72 across the vertical slot 74. The lock screws 75 serve to draw together the central hub portion 72 across the vertical slot 74.

A split bushing 76 fits into the central vertical bore 73 and has an elevating nut 77 at its bottom end. The elevating nut 77 is internally threaded to engage the threaded main support stud shaft 46 (see FIGURE 4). The split bushing 76 surrounds the threaded main support shaft 46. Vertical slots 78 are provided in the split bushing 76.

A snap ring 79 fits into a peripheral groove around the split bushing 76 to secure it within the central vertical bore 73.

To adjust the level of the toggle arm support block 48, the elevating nut 77 is turned along the threaded main support stud shaft 46 to the desired height. The change in position is accomplished while the lock screws 75 are partly disengaged. When the desired level is attained, the lock screws 75 are tightened to cause the central hubs 72 to draw together across the vertical slot 74, thereby applying peripheral compression to the split bushing 76 which engages the threaded main support stud shaft 46 in a rigid manner.

*Adjustability*

Figure 10:
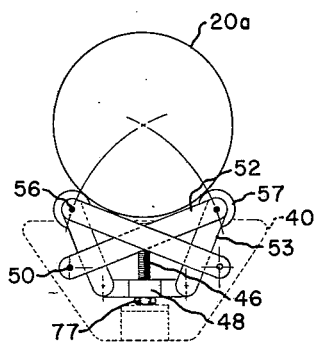
FIGURES 10, 11 and 12 are schematic illustrations of the present cradle supporting structure in positions adapted to support a large diameter rotor (FIGURE 10), an intermediate diameter rotor (FIGURE 11) and a small diameter rotor (FIGURE 12).
Figure 11:
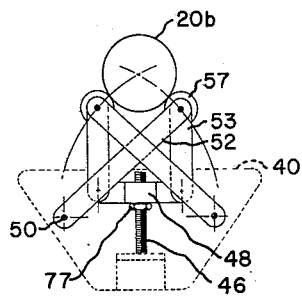
Figure 12:
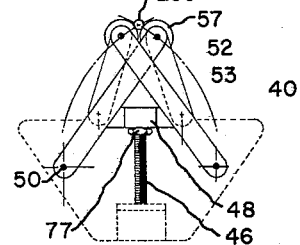

By altering the level of the toggle arm support block 48 as just described, the rotor supporting wheels 57 can be brought closer together or farther apart to accommodate narrow diameter or wide diameter rotors respectively. Three typical positions of the cradle assembly are illustrated in FIGURES 10, 11 and 12. It will be seen from FIGURE 10 that when the toggle arm support block 48 is positioned at the bottom of the threaded main support stud shaft 46, the rotor supporting wheels 57 have their widest separation and can accommodate a large diameter rotor 20a. From FIGURE 11 it will be seen that when the toggle arm support block 48 is positioned intermediately on the threaded main support stud shaft 46, the rotor supporting wheels 57 can accommodate intermediate sized rotors 20b. From FIGURE 12 it is seen that when the toggle arm support block 48 is at the top of the threaded main support stud shaft 46, the rotor supporting wheels 57 can accommodate small diameter rotor 20c.

It will be apparent from inspection of FIGURES 10, 11 and 12 as a group that the elevation of the central axis of any rotor (20a, 20b, 20c) can be maintained constant through appropriate adjustment of the rotor supporting wheels 57. The locus of the axis of the horizontal pins 56 (about which the rotor supporting wheels 57 are free to turn) is a circular arc having its center at the pins 50.

Thus from a single mounting of present support stands to the horizontal bed of a lathe numerous rotors may be investigated without removing or replacing the stands. The mounting means for each stand preferably is the same type which is normally employed to secure a steady-rest and a follow-rest to the horizontal bed of the lathe. Suitably, the identical mounting means may be employed by merely removing the steady-rest and follow-rest from their normal mounting means and replacing them with the present lathe support stands fastened to the mounting means.

Thus each balance stand comprises a lower portion which is adapted to be secured at any of a variety of locations along the horizontal bed of a lathe and also an upper portion which is adapted to support rotors of various diameters in line with the drive axis of the lathe.

Referring once more to FIGURE 2, a scale indication is presented in the form of numbered spaces 94 along the exposed surface of the cradle face plate 40. A pointer 95 may be affixed to the toggle arm support block 48 in alignment with the scale indications 94 to permit accurate positioning of the toggle arm support block 48 to accommodate test rotors of any dimension. As shown in FIGURE 2, the scale indications represent rotor diameters ranging from zero through twenty inches.

If desired, as shown in FIGURE 2, a suitable guard structure may be provided above the present support stands to prevent accidental movement of the test rotor particularly at high speed dynamic testing conditions. The guard structure includes a generally horizontal rod 81 having a handle 82 on the operating side of the support stand. The guard rod 81 is hingedly secured in a suitable hinge assembly 83 associated with the end plate 31 and is locked in a suitable locking assembly 84 associated with the end plate 32.

*Vibration Magnification Means*

Figure 9:
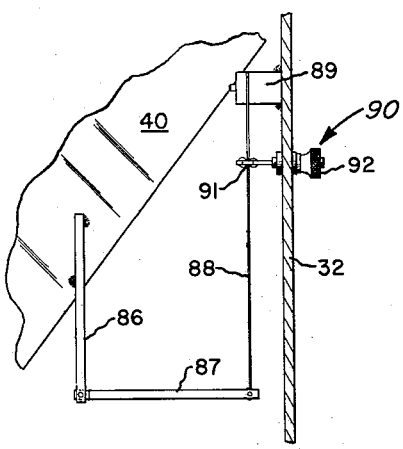
FIGURE 9 is a fragmentary cross-sectional illustration of a vibration magnifying feature shown in FIGURE 2.

In order to compensate for the inertia of the oscillatable cradle assembly, a vibratable reed oscillation magnifier may be provided. The apparatus is seen in FIGURES 2 and 9. A stationary link arm 86 is secured to one of the cradle face plates 40. Pivotally attached to the bottom of the stationary link arm 86 is a horizontal link arm 87. A vibratable reed 88, formed from spring steel, for example, is attached to the other end of the horizontal link arm 87 and secured at its upper end to a clamping boss 89 which is fastened to the stationary end plate 32. The vibratable reed 88 has a natural oscillating frequency dependent upon its unsupported length. The unsupported length can be adjusted by means of a clamp 90 having a slot 91 through which the vibratable reed 88 extends. The clamp 90 can be fastened to the end plate 32 at any desired height by means of a knurled nut 92. By sliding the clamp 90 upwardly or downwardly along the vibratable reed 88, its unsupported length (between the slot 91 and the horizontal link arm 87) can be altered.

The vibratable reed 88 provides a resilient connector between the oscillating cradle assembly and the balance stand housing. The length of the vibratable reed 88 is adjusted so that its natural spring frequency coincides with the rotational speed of the rotor undergoing test. Thus the vibrating reed will be in resonance with the rotor's unbalanced vibrations which are cyclically repetitive. The spring forces of the vibratable reed 88 will coact with the unbalance vibrations of the rotor. Both forces will coincide in their action against the cradle assembly to increase its amplitude of oscillation. An increased oscillatory amplitude will increase the amplitude of the voltage generated within the electromagnetic transducer 22 for greater sensitivity in the analysis of the electrical signal within the electrical wave analyzing apparatus 24.

According to the provisions of the patent statutes, I have explained the principle, preferred embodiment and mode of operation of my invention and have illustrated and described what I now consider to represent its best embodiment. However, I desire to have it understood that, within the scope of the appended claims, the invention may be practiced otherwise than as specifically illustrated and described.

I claim:

1. Supporting apparatus for use in dynamic balancing of rotors comprising a stationary housing adapted to be secured to the horizontal bed of a lathe, said housing including parallel trunnion plates, a first pivot shaft at the upper corners of each trunnion plate extending between said trunnion plates, a rigid cradle formed from a pair of parallel cradle plates, a second pivot shaft at the upper corners of each cradle plate extending between said cradle plates, a pair of pendulum rods each pivotally connected to a said first pivot shaft at its upper end and to a said second pivot shaft at its lower end whereby said rigid cradle is oscillatable between said trunnion plates, a pair of wheels mounted upon and between said cradle plates and extending thereabove, and electromechanical transducer means associated with said cradle for generating electrical signals in response to oscillatory movement of said cradle.

2. The supporting apparatus of claim 1 wherein a guard bar is provided upon said housing extending from one side thereof across and above said pair of wheels to the other side thereof to encompass a rotor supported by said apparatus without contacting such rotor.

3. Supporting apparatus for use in dynamic balancing of rotors comprising a stationary housing, means for securing said stationary housing to the horizontal bed of a lathe, said housing including parallel trunnion plates, a first pivot shaft at the upper corners of each trunnion plate extending between said trunnion plates, a rigid cradle formed from a pair of parallel cradle plates, a second pivot shaft at the upper corners of each cradle plate extending between said cradle plates, a pair of pendulum rods each pivotally connected to a said first pivot shaft at its upper end and to a said second pivot shaft at its lower end whereby said cradle is oscillatable between said trunnion plates, a toggle arm support block having a pair of journals disposed on each side between said cradle plates, said toggle arm support block being vertically slidable between said cradle plates, two pairs of crisscross arms pivotally secured one pair to each side of said cradle plates, two pairs of toggle arms secured one pair to each of said journals, a pair of rotor rolls each one mounted upon a shaft extending through the upper end of one pair of said crisscross arms and one pair of said toggle arms, whereby the distance between said pair of rotor rolls is dependent upon the elevation of said toggle arm support block with respect to said cradle plates.

4. The supporting apparatus of claim 3 wherein said toggle arm support block has an indicator arm which is slidable along an indicating scale in accordance with the elevation of said toggle arm support block with respect to said cradle plates.

5. Supporting apparatus for use in dynamic balancing of rotors comprising a stationary housing, means for securing said housing to the horizontal bed of a lathe, said housing including parallel trunnion plates, a first pivot shaft at the upper corners of each trunnion plate extending between said trunnion plates, a rigid cradle formed from a pair of parallel cradle plates, a second pivot shaft at the upper corners of each cradle plate extending between said cradle plates, a pair of pendulum rods each pivotally connected to a said first pivot shaft at its upper end and to a said second pivot shaft at its lower end whereby said rigid cradle is oscillatable between said trunnion plates, a vertical stud shaft centrally secured between said cradle plates, a toggle arm support block having a pair of journals disposed on each side between said cradle plates, said toggle arm support block further having a vertical central aperture which receives said vertical stud shaft whereby said toggle arm support block is vertically slidable along said vertical stud shaft, two pairs of crisscross arms pivotally secured one pair at each side of said cradle plates, two pairs of toggle arms secured one pair to each of said journals, a pair of rotor rolls each one mounted on a shaft extending through the upper end of one pair of said crisscross arms and one pair of said toggle arms, whereby the distance between said pair of rotor rolls is dependent upon the elevation of said toggle arm support block with respect to said cradle plates.

6. The supporting apparatus of claim 5 wherein said vertical stud shaft is externally threaded and a corresponding internally threaded support nut is threadedly engaged therewith beneath said toggle arm support block.

7. The supporting apparatus of claim 6 wherein the toggle arm support block is grooved across its vertical central aperture and threaded fasteners extend through the said block across the resulting groove.

References Cited in the file of this patent
UNITED STATES PATENTS

| | | |
|---|---|---|
| 1,347,316 | Akimoff | July 20, 1920 |
| 2,123,443 | Taylor | July 12, 1938 |
| 2,186,339 | Moore | Jan. 9, 1940 |
| 2,656,710 | Weaver et al. | Oct. 27, 1953 |
| 2,722,465 | Ellis | Nov. 1, 1955 |

OTHER REFERENCES

Pages 104–106, Elements of Mechanical Vibrations, by Freberg-Kemler published by Wiley in 1947. Copy available U.S. Patent Office Division 36 (Murray).